Figure 1:
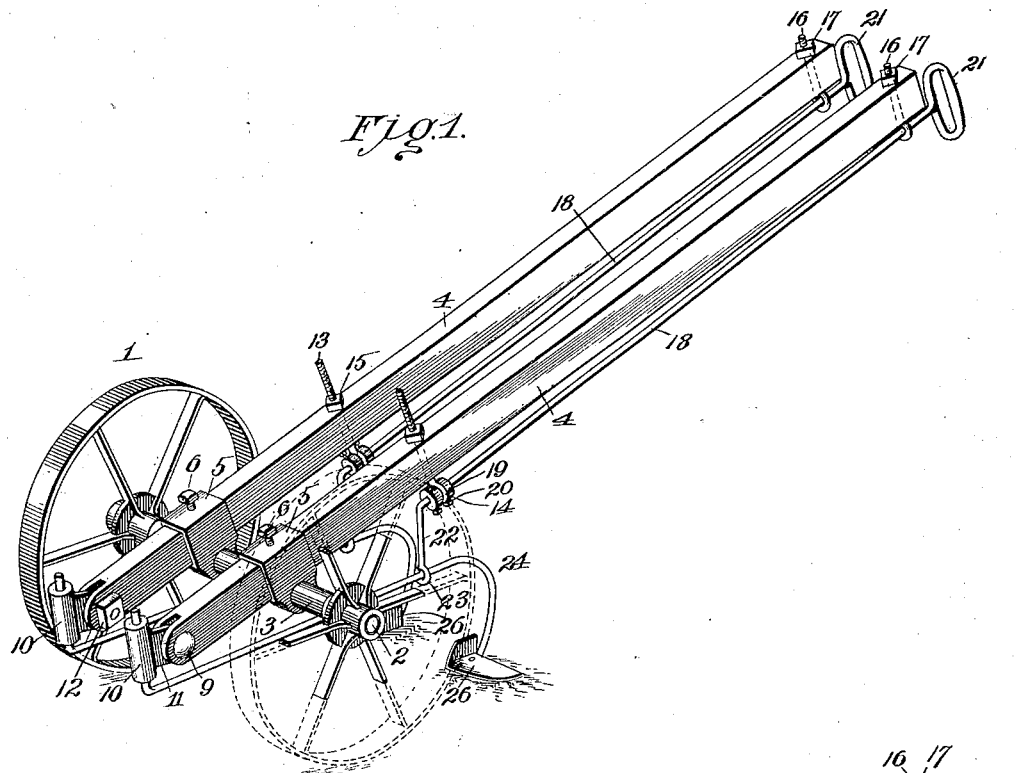

No. 662,593.　　　　　　　　　　　　　　　Patented Nov. 27, 1900.
G. W. CHASE.
GARDEN CULTIVATOR.
(Application filed Nov. 16, 1899.)

(No Model.)

Witnesses:
H. C. Rodgers
R. E. Riley

Inventor.
Geo. W. Chase
By Fischer & Thorpe
Att'ys.

THE NORRIS PETERS CO., PHOTO-LITHO., WASHINGTON, D. C.

UNITED STATES PATENT OFFICE.

GEORGE W. CHASE, OF KANSAS CITY, MISSOURI.

GARDEN-CULTIVATOR.

SPECIFICATION forming part of Letters Patent No. 662,593, dated November 27, 1900.

Application filed November 16, 1899. Serial No. 737,222. (No model.)

*To all whom it may concern:*

Be it known that I, GEORGE W. CHASE, a citizen of the United States, residing at Kansas City, in the county of Jackson and State of Missouri, have invented a new and useful Garden-Cultivator, of which the following is a specification.

My invention relates to garden-cultivators; and one object is to produce a machine of this character in which the lateral adjustment of the hoes is only limited by the width of the machine and in which the vertical adjustment of the handles may accommodate the tallest and shortest of operators.

A further object is to provide a construction wherein the lateral adjustment of the hoes may be effected together or with complete independence of each other and wherein the vertical adjustment of the handles may also be effected together or independently, this independent lateral adjustment of the hoes making it possible for the operator to cultivate as closely as he cares to the plants and at the same time avoid plants which are growing somewhat out of line, or other obstructions in the path of the hoes, the vertical adjustment permitting the operator to regulate the depth of cut to a nicety and to hold and propel the machine in a position where he can utilize his strength to the greatest advantage.

A still further object is to produce a garden-cultivator in which simplicity, strength, durability, and cheapness of manfacture are combined in a high degree.

With the various objects enumerated in view the invention consists in certain novel and peculiar features of construction and combinations of parts, as will be hereinafter described and claimed, and in order that it may be fully understood reference is to be had to the accompanying drawings, in which—

Figure 2:
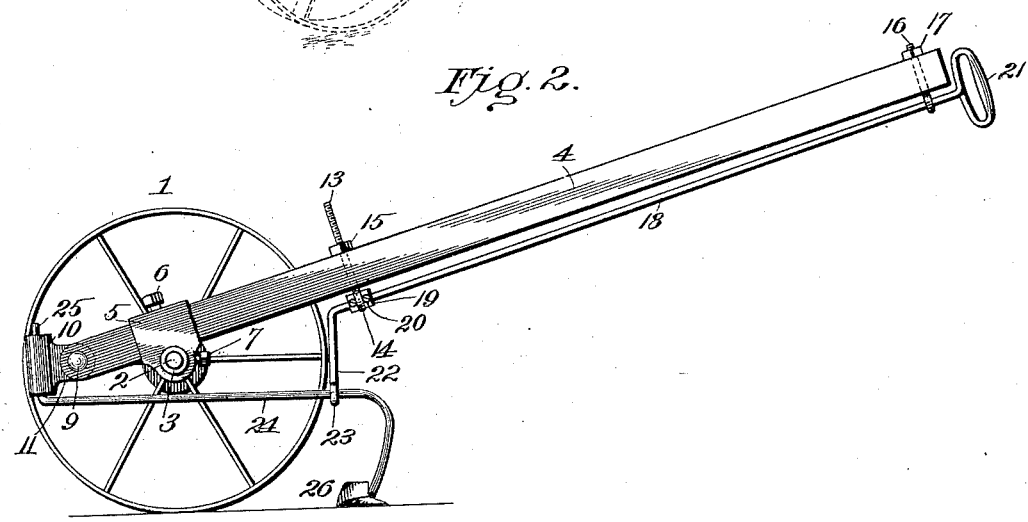

Figure 1 is a perspective view with the near wheel shown partly in dotted lines in order to more clearly disclose the mechanism beyond. Fig. 2 is a side elevation with the near wheel omitted.

Referring to the drawings in detail, 1 designates a pair of wheels of such size that their connecting-shaft 2 will easily pass over the young and tender plants to be cultivated. Said wheels are mounted upon the shaft in any usual or preferred manner, and journaled upon said shaft and extending from one wheel to the other is a sleeve 3, divided centrally into two sections or members which may turn independently upon the shaft.

4 designates a pair of bars, preferably of wood and rectangular in cross-section.

5 designates a pair of rectangular sleeves fitting upon said bars and carrying set-screws 6, which are adapted to impinge upon the bars and secure them at the desired point of adjustment with relation to the sleeves 5. Said sleeves 5 below the bars are mounted upon the rotatable sleeves 3 and are secured rigidly on the same at the desired point of lateral adjustment by means of set-screws 7.

The front ends of the bars 4 are vertically bifurcated, as at 8, and pivoted upon bolts 9, extending horizontally through said bifurcated ends, are the arms 11 of the sleeves 10, these sleeves being adapted to be adjusted upon the pivot-bolts 9 and clamped at the desired point of adjustment by means of the clamping-nuts 12, one only of which appears. At equal distances from their ends but rearward of the sleeves 5 the bars 4 carry long bolts 13, terminating at their lower ends in eyes or bearings 14, said bolts being maintained at the desired point of adjustment in said bars by the clamping-nuts 15. At the rear ends of the bars are carried the similar but shorter eyebolts 16 with their eyes at their lower ends and clamped in position by the nuts 17.

18 designates a pair of rock-shafts journaled in the eyes of bolts 13 16 and prevented from sliding longitudinally therein by means of the collars 19, secured by set-screws 20, at opposite sides of eyebolts 13. Said shafts 18 terminate in vertically-disposed handle-loops 21 at their rear ends and at their front ends are formed with the crank-arms 22, terminating in loops 23.

The cultivating device comprises a pair of shanks 24, which extend loosely through the crank-arm loops 23 and are formed at their front ends with the upwardly-projecting arms 25, journaled in adjustable sleeves 10, and at their rear ends curve downward and slightly forward in the customary manner and terminate in hoes or shovels 26 of any preferred style or construction, said hoes to be attached to the shanks in any suitable or preferred manner.

To operate the above-described mechanism, the handles 21 are grasped, and if they occupy a position wherein the operator can apply his strength most conveniently he disposes the machine in line with the row of plants to be cultivated and pushes the machine forward. If he meets with stones or other obstructions in the path of either hoe, he simply pulls upward on the corresponding handle in order that the hoe may pass over such obstruction. If the obstruction is at both sides, he raises both hoes in the manner described. If he approaches a plant growing slightly out of line, and therefore in danger of being cut by the adjacent hoe, he twists the corresponding handle so as to rock its shaft and swing said hoe outward until it has passed the plant, the shank of said hoe operating with its arm 25, journaled in sleeve 10, as a pivot. It will thus be seen that the hoes are in perfect control of the operator and that the plants may be cultivated to the best advantage as they are under observation at all times, there being no connection between the bars 4 of the shafts which can interrupt the view of the operator even for a moment. If the width of the rows is such that the wheels must travel at substantially equal distances from the center, even though the line of plants is to one side of the latter, the operator without the slightest difficulty twists both handles so as to maintain them in a parallel relation, and the hoes at the same distance apart, the latter to conform to the irregular disposition of the plants and cultivate at opposite sides of and at equal distances from the same. As the hoes are turned toward one side or the other they also swing slightly upward, which movement, however, is accommodated so as to continue cultivating the plants at the proper depth by a slight lowering of the handle end of the machine. This movement is accompanied by a slight upward movement of the front ends of the bars, which last movement, however, has no tendency to raise the shovels out of the ground. To cultivate the ground at varying distances apart, the set-screws 7 are loosened and the bar-carrying sleeves 5 are adjusted toward or from each other upon the divided sleeve 3 and are clamped in the desired position by set-screws 7 being caused to again impinge upon the divided sleeve, as will be readily understood.

To accommodate a person who prefers to have the handles at the highest point of adjustment possible, the set-screws 6 may be loosened and the bars 4 withdrawn through the sleeves 5 until the nuts 12 are almost in contact with said sleeves, which adjustment gives a longer leverage to the operator and permits him consequently to raise the handles to the altitude desired, the handles being raised by simply pushing upward upon them, the sleeves 3 rotating upon the shaft or axle 2 under such pressure on the handles. The elevation of the handle end of the machine of course raises the hoes a proportionate distance above the ground, and in order to restore the latter to their proper working position without lowering the handle end of the machine the nuts 15 are turned to force the eyebolts 13 downward the proper distance. The adjustment of the bars 4 to the new position above referred to must also be followed by a new adjustment of the pivoted sleeves 10. The nearer said sleeves approach the axis of the machine the more nearly a position parallel with but above the bars 4 must they approach. In other words, they must be swung upwardly upon their pivots to the required position and then clamped reliably in such position by the clamping-nuts 12. This upward adjustment of said sleeves of course depresses the shanks, the latter swinging downward with the bolts 9 as the center of motion, as will be readily understood by reference particularly to Fig. 2.

From the above description it will be apparent that I have produced a garden-cultivator which embodies the features of advantage enumerated as desirable in the statement of invention, in which the hoes are at all times under perfect control of the operator and may cultivate at different depths, at different distances from the plants, or by the operation of one or both of the shovels adapt the machine to all irregularities of planting or in the surface of the ground.

I am aware that hand-cultivators have been patented wherein the cultivators may be raised or lowered independently of each other, and also swung closer together or farther apart. I am not aware, however, of any garden-cultivator embodying parts which are independently adjustable toward or from each other and up or down in order that the hoes may be stationed at varying distances apart or one or the other of them elevated to ride freely over an obstruction in its former path; nor am I aware of a cultivator wherein one of the hoes may be swung laterally to avoid an obstruction without interrupting the cultivating action of the other, nor a machine wherein the hoes may be both moved laterally in the same direction to accommodate one or more plants growing out of line with the direction of travel of the carrying-wheels. By means of my cultivator all of these objects are effected easily and quickly, and in addition may be adjusted to accommodate tall or short operators with equal convenience.

Having thus described the invention, what I claim as new, and desire to secure by Letters Patent, is—

1. A garden-cultivator, comprising an axle, wheels mounted thereon, bars mounted upon the axle, cultivating-hoes, shanks for said hoes and pivoted to the front ends of said bars to swing the hoes laterally, and rock-shafts carried by the bars and provided with crank-arms pivotally engaging said shanks, substantially as described.

2. A garden-cultivator, comprising an axle, wheels mounted thereon, bars mounted thereon, sleeves pivoted at the front ends of said bars to swing vertically, cultivating-hoes, shanks for said hoes, provided with arms journaled in said sleeves, and rock-shafts carried by the bars and provided with crank-arms pivotally engaging said shanks and adapted to swing transversely of the line of draft and to swing the said shanks correspondingly, substantially as described.

3. A garden-cultivator, comprising an axle, wheels therefor, bars mounted on the axle, sleeves pivoted to said bars to swing vertically, cultivating-hoes, shanks for said hoes provided with arms journaled in said sleeves, eyebolts secured to the bars, and rock-shafts journaled in said eyebolts and provided at their front ends with crank-arms pivotally engaging said shanks, substantially as described.

4. A garden-cultivator, comprising an axle, wheels, laterally-adjustable sleeves upon the axle, bars adjustable in said sleeves at right angles to the axle, and cultivating appliances carried by said bars, substantially as described.

5. A garden-cultivator, comprising an axle, wheels, a divided sleeve journaled on the axle, laterally-adjustable sleeves mounted on the divided sleeve, bars adjustable in said laterally-adjustable sleeves, and cultivating appliances carried by said bars, substantially as described.

In testimony whereof I affix my signature in the presence of two witnesses.

GEORGE W. CHASE.

Witnesses:
  H. C. RODGERS,
  G. Y. THORPE.